(12) United States Patent
Kumagai et al.

(10) Patent No.: US 11,855,820 B2
(45) Date of Patent: Dec. 26, 2023

(54) TERMINAL AND COMMUNICATION METHOD

(71) Applicant: NTT DOCOMO, INC., Tokyo (JP)

(72) Inventors: Shinya Kumagai, Tokyo (JP); Hiroki Harada, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/758,842

(22) PCT Filed: Jan. 23, 2020

(86) PCT No.: PCT/JP2020/002413
§ 371 (c)(1),
(2) Date: Jul. 14, 2022

(87) PCT Pub. No.: WO2021/149231
PCT Pub. Date: Jul. 29, 2021

(65) Prior Publication Data
US 2023/0051403 A1    Feb. 16, 2023

(51) Int. Cl.
*H04L 27/26*    (2006.01)

(52) U.S. Cl.
CPC ................ *H04L 27/2607* (2013.01)

(58) Field of Classification Search
CPC .. H04L 27/2607; H04L 27/2666; Y02D 30/70
See application file for complete search history.

(56) References Cited

U.S. PATENT DOCUMENTS

| 2009/0196229 | A1* | 8/2009 | Shen | H04L 5/0048 |
| | | | | 370/328 |
| 2020/0280465 | A1* | 9/2020 | Kim | H04L 25/0226 |
| 2021/0045163 | A1 | 2/2021 | Chai et al. | |

FOREIGN PATENT DOCUMENTS

| EP | 4 014 380 A1 | 6/2022 |
| WO | 2019/206318 A1 | 10/2019 |
| WO | 2021/104333 A1 | 6/2021 |

OTHER PUBLICATIONS

3GPP TS 38.331 V15.8.0; "3rd Generation Partnership Project; Technical Specification Group Radio Access Network; NR; Radio Resource Control (RRC) protocol specification (Release 15)", Dec. 2019 (532 pages).

3GPP TS 38.212 V16.0.0; "3rd Generation Partnership Project; Technical Specification Group Radio Access Network; NR; Multiplexing and channel coding (Release 16)"; Dec. 2019 (145 pages).

(Continued)

*Primary Examiner* — Sung S Ahn
(74) *Attorney, Agent, or Firm* — Osha Bergman Watanabe & Burton LLP

(57) ABSTRACT

A terminal includes a reception unit configured to receive information for allocating uplink transmission from a base station; a control unit configured to determine a CP extension value in a case where a parameter for calculating the CP extension value is not configured by the base station upon receiving the information; and a transmission unit configured to execute the uplink transmission by applying the determined CP extension value.

5 Claims, 10 Drawing Sheets

(56) References Cited

OTHER PUBLICATIONS

3GPP TS 38.213 V16.0.0; "3rd Generation Partnership Project; Technical Specification Group Radio Access Network; NR; Physical layer procedures for control (Release 16)"; Dec. 2019 (146 pages).
3GPP TS 37.213 V16.0.0; "3rd Generation Partnership Project; Technical Specification Group Radio Access Network; Physical layer procedures for shared spectrum channel access (Release 16)"; Dec. 2019 (25 pages).
International Search Report for corresponding International Application No. PCT/JP2020/002413, dated Sep. 8, 2020 (3 pages).
Written Opinion for corresponding International Application No. PCT/JP2020/002413, dated Sep. 8, 2020 (3 pages).
Extended European Search Report issued in counterpart European Application No. 20915795.7 dated Sep. 5, 2023 (8 pages).

* cited by examiner

TERMINAL AND COMMUNICATION METHOD

TECHNICAL FIELD

The present invention relates to a terminal and a communication method in a radio communication system.

BACKGROUND ART

In NR (New Radio) (also referred to as "5G") as the successor to LTE (Long Term Evolution), techniques have been being discussed to satisfy the requirements of high-capacity system, high-speed data transmission, low latency, a larger number of terminal connections, low cost, power saving, and the like.

Also, in order to expand a frequency band, existing LTE systems support use of a frequency band (also referred to as an unlicensed band, unlicensed carrier, or unlicensed CC) that is different from a frequency band licensed to a telecommunications carrier (an operator) (licensed band). As the unlicensed band, for example, the 2.4-GHz band or the 5-GHz band in which Wi-Fi (registered trademark) or Bluetooth (registered trademark) can be used, the 6-GHz band, or the like is assumed.

Specifically, Rel-13 supports carrier aggregation (CA) that integrates a carrier (CC) of a licensed band with a carrier (CC) of an unlicensed band. Communication using an unlicensed band together with a licensed band in this way is referred to as license-assisted access (LAA).

In a radio communication system that executes communication using an unlicensed band together with a licensed band, in order to confirm whether transmission is being executed by another device (e.g., a base station device, a user terminal, a Wi-Fi device, etc.), before transmitting data in the unlicensed band, a base station device (downlink) and a user terminal (uplink) execute channel sensing (carrier sensing). As a result of the sensing, once it is confirmed that no transmission is being executed by another device, a transmission opportunity is obtained and transmission can be executed. This operation is referred to as an LBT (Listen Before Talk). Also, in NR, a system that supports the unlicensed band is referred to as an NR-U system.

RELATED ART DOCUMENTS

Non-Patent Documents

[Non-Patent Document 1] 3GPP TS 38.331 V 15.8.0 (2019-12)
[Non-Patent Document 2] 3GPP TS 38.212 V 16.0.0 (2019-12)
[Non-Patent Document 3] 3GPP TS 38.213 V 16.0.0 (2019-12)
[Non-Patent Document 4] 3GPP TS 37.213 V 16.0.0 (2019-12)

SUMMARY OF THE INVENTION

Problem to be Solved by the Invention

In NR-U, an LBT gap based on the CP extension (Cyclic Prefix extension) has been discussed for UL transmission executed by a terminal. For example, at least for a CP extension before transmitting a PUSCH (Physical Uplink Shared Channel) that is dynamically scheduled, the CP extension may be placed at the first symbol of a PUSCH allocation indicated by an SLIV (Start and Length Indicator). At this time, the period of the CP extension (the time length) is indicated by a base station to the terminal by RRC (Radio Resource Control) signaling and downlink control information (DCI). Meanwhile, depending on the communication state, it has been necessary for the terminal to specify the period of the CP extension before the RRC configuration is executed.

The present invention has been made in view of the above, and has an object, in a radio communication system, to determine a value of a CP extension (Cyclic Prefix Extension) and to apply the value to communication.

Means for Solving the Problem

According to the disclosed technique, a terminal is provided that includes a reception unit configured to receive information for allocating uplink transmission from a base station; a control unit configured to determine a CP extension value in a case where a parameter for calculating the CP extension value is not configured from the base station upon receiving the information; and a transmission unit configured to execute the uplink transmission by applying the determined CP extension value.

Effect of the Present Invention

According to the disclosed technique, in a radio communication system, a value of a CP extension (Cyclic Prefix Extension) can be determined and applied to communication.

EMBODIMENTS FOR CARRYING OUT THE INVENTION

In the following, embodiments of the present invention will be described with reference to the drawings. Note that an embodiment described below merely presents an example, and an embodiment to which the present invention can be applied is not limited to the following embodiments.

When operating a radio communication system of an embodiment of the present invention, existing technologies may be used appropriately. Here, the existing technology may be, for example, an existing LTE, but is not limited to the existing LTE. Also, in the present description, it is assumed that the term "LTE" has a broad meaning, including LTE-Advanced and schemes after LTE-Advanced (e.g., NR), unless otherwise noted.

Also, embodiments according to the present invention described below use the terms used in the existing LTE such as SS (Synchronization signal), PSS (Primary SS), SSS (Secondary SS), PBCH (Physical broadcast channel), PRACH (Physical random access channel), PDCCH (Physical Downlink Control Channel), PDSCH (Physical Downlink Shared Channel), PUCCH (Physical Uplink Control Channel), PUSCH (Physical Uplink Shared Channel), and the like. These are used for the sake of convenience of description; and signals, functions, and the like similar to these may be called by other names. Also, in NR, the terms described above correspond to NR-SS, NR-PSS, NR-SSS, NR-PBCH, NR-PRACH, and the like. However, even for a signal used in NR, it is not necessarily denoted with "NR-".

In addition, in the embodiment of the invention, a duplexing scheme may be Time Division Duplexing (TDD) scheme, may be Frequency Division Duplexing (FDD) scheme, or may be other schemes (for example, Flexible Duplexing or the like).

Also, in an embodiment of the present invention, stating that a radio parameter or the like is set (configured) may mean that a predetermined value is set in advance (pre-configured), or that a radio parameter indicated by a base station 10 or a terminal 20 is set.

Figure 1:
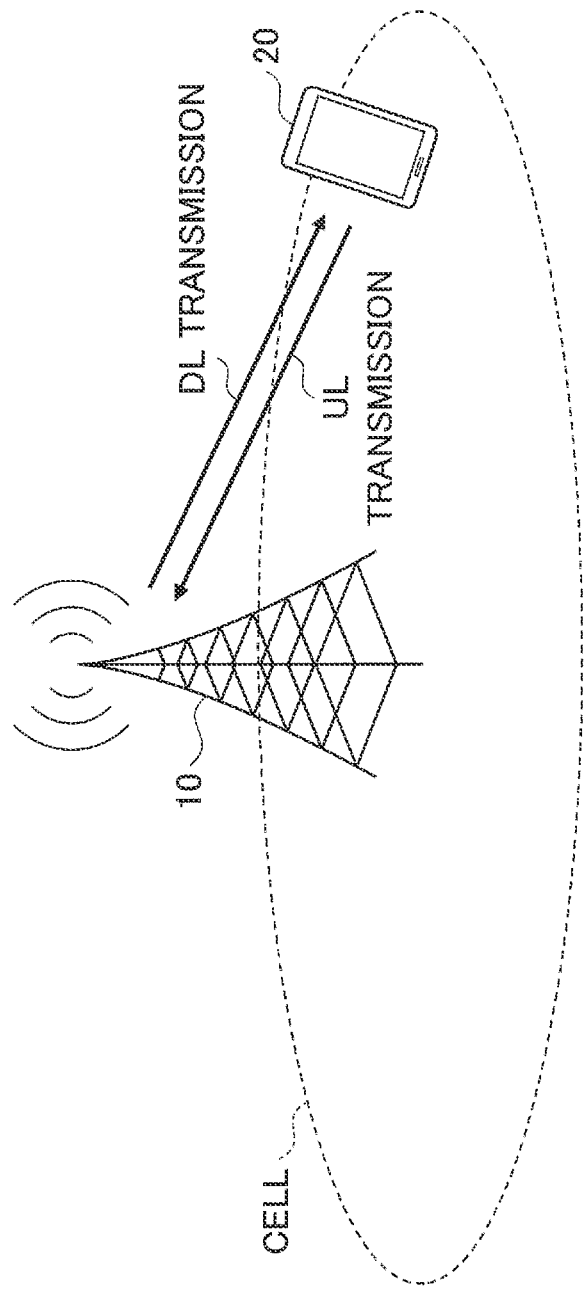
FIG. 1 is a diagram illustrating an example of a configuration of a radio communication system in an embodiment according to the present invention.

FIG. 1 is a diagram illustrating an example of a configuration of a radio communication system in an embodiment according to the present invention. A radio communication systems in an embodiment according to the present invention includes a base station 10 and a terminal 20 as illustrated in FIG. 1. In FIG. 1, although one base station 10 and one terminal 20 are illustrated, this is merely an example, and there may be more than one base station and one terminal 20.

The base station 10 is a communication device that provides one or more cells, and executes radio communication with the terminal 20. Physical resources of a radio signal are defined in the time domain and in the frequency domain, where the time domain may be defined in terms of the number of OFDM (Orthogonal Frequency Division Multiplexing) symbols, and the frequency domain may be defined in terms of the number of subcarriers or the number of resource blocks. The base station 10 transmits synchronization signals and system information to the terminal 20. The synchronization signals are, for example, an NR-PSS and an NR-SSS. The system information is transmitted by, for example, an NR-PBCH, and is also referred to as broadcasting information. As illustrated in FIG. 1, the base station 10 transmits a control signal or data to the terminal 20 by a DL (Downlink), and receives a control signal or data by an UL (Uplink) from the terminal 20. Both the base station 10 and the terminal 20 can execute beam forming for transmission and reception of signals. Also, both the base station 10 and the terminal 20 can apply communication by MIMO (Multiple Input Multiple Output) to a DL or UL. Also, both the base station and the terminal 20 may communicate via a secondary cell (SCell) and a primary cell (PCell) by CA (Carrier Aggregation). Further, the terminal 20 may communicate via a primary cell of the base station 10 by DC (Dual Connectivity) and a primary secondary cell (PSCell) of another base station 10.

The terminal 20 is a communication device provided with radio communication functions, such as a smartphone, cellular phone, tablet, wearable terminal, M2M (Machine-to-Machine) communication module, or the like. As illustrated in FIG. 1, the terminal 20 receives control signals or data from the base station 10 by a DL, and transmits control signals or data to the base station 10 by a UL, and by doing so, makes use of various communications services provided by the radio communications system.

Figure 2:
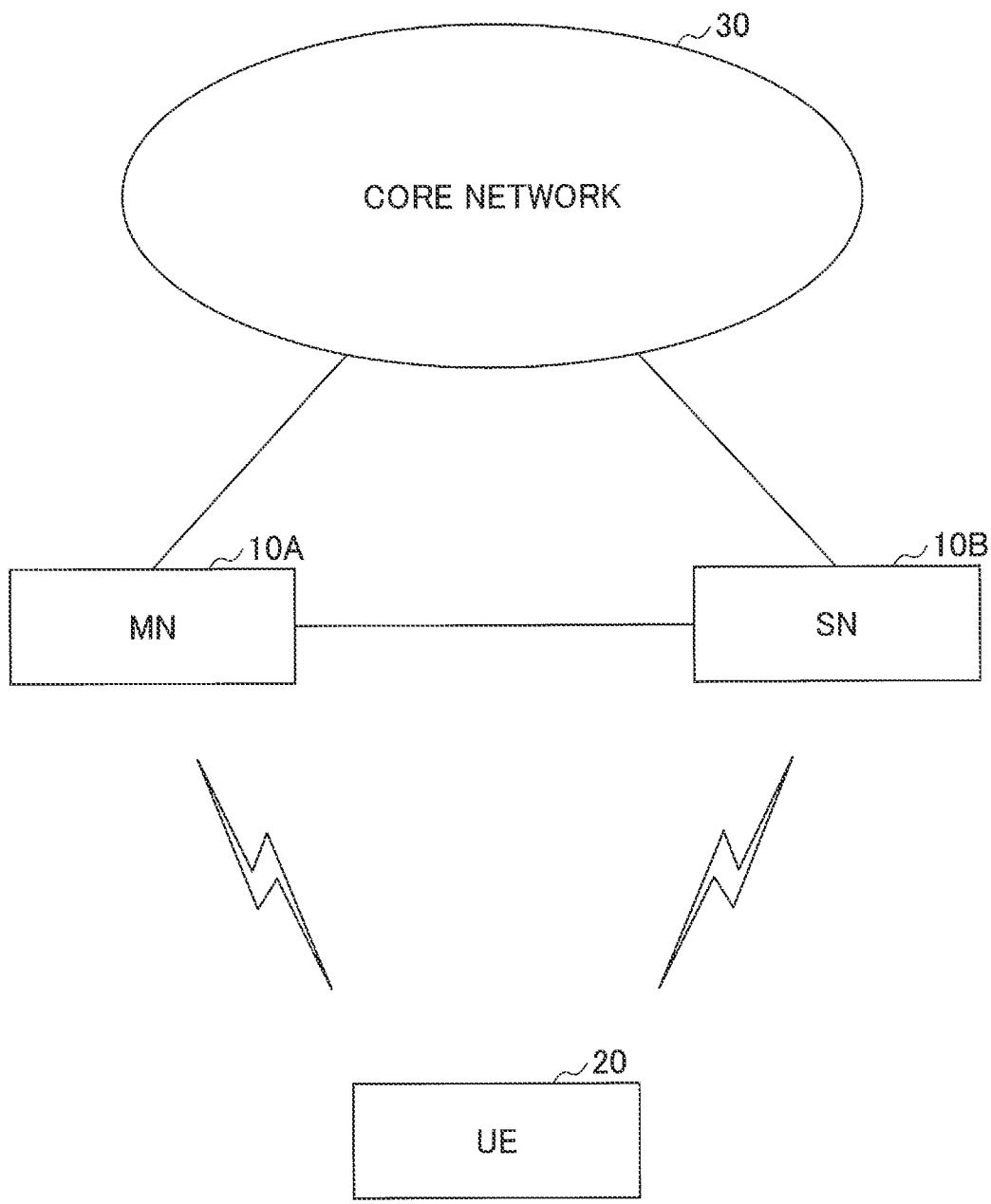
FIG. 2 is a diagram for describing a radio communication system in an embodiment according to the present invention.

FIG. 2 is a diagram for describing a radio communication system in an embodiment according to the present invention. FIG. 2 illustrates an example of a configuration of a radio communication system in the case where NR-DC (NR-Dual connectivity) is executed. As illustrated in FIG. 2, a base station 10A serving as an MN (Master Node) and a base station 10B serving as an SN (Secondary Node) are provided. Each of the base station 10A and the base station 10B is connected to a core network 30. The terminal 20 communicates with both the base station 10A and the base station 10B.

A cell group provided by the base station 10A as the MN is referred to as an MCG (Master Cell Group), and a cell group provided by the base station 10B as the SN is referred to as an SCG (Secondary Cell Group). Operations that will described later may be executed in either of the configuration in FIG. 1 or in FIG. 2.

In the radio communication system in the present embodiment, the LBT described above is executed. In the case where the LBT result is idle (in the case where the LBT is successful), the base station 10 or the terminal 20 obtains a COT (Channel Occupancy Time) to execute transmission; or in the case where the LBT result is busy (LBT-busy), the base station 10 or the terminal 20 does not execute transmission.

The radio communication system in the present embodiment may execute operations of carrier aggregation (CA) using an unlicensed CC and a licensed CC; may execute operations of dual connectivity (DC) using an unlicensed CC and a licensed CC; or may execute stand-alone (SA) operations using only an unlicensed CC. CA, DC, or SA may be executed by either one of an NR system or an LTE system. DC may be executed by at least two among NR, LTE, and the other systems.

The terminal 20 may assume presence of a signal in a PDCCH or group common (GC) PDCCH to detect a transmission burst from the base station 10 (e.g., a reference signal (RS) such as a demodulation reference signal (DMRS)).

When the COT is started triggered by the base station device, the base station 10 may transmit a specific PDCCH (PDCCH or GC-PDCCH) that includes a specific DMRS indicating the start of the COT. At least one of the specific PDCCH and the specific DMRS may be referred to as a COT start indicating signal. For example, the base station 10 transmits the COT start indicating signal to one or more terminals 20, and the terminal 20 can recognize the COT in the case of detecting the specific DMRS.

Figure 3:
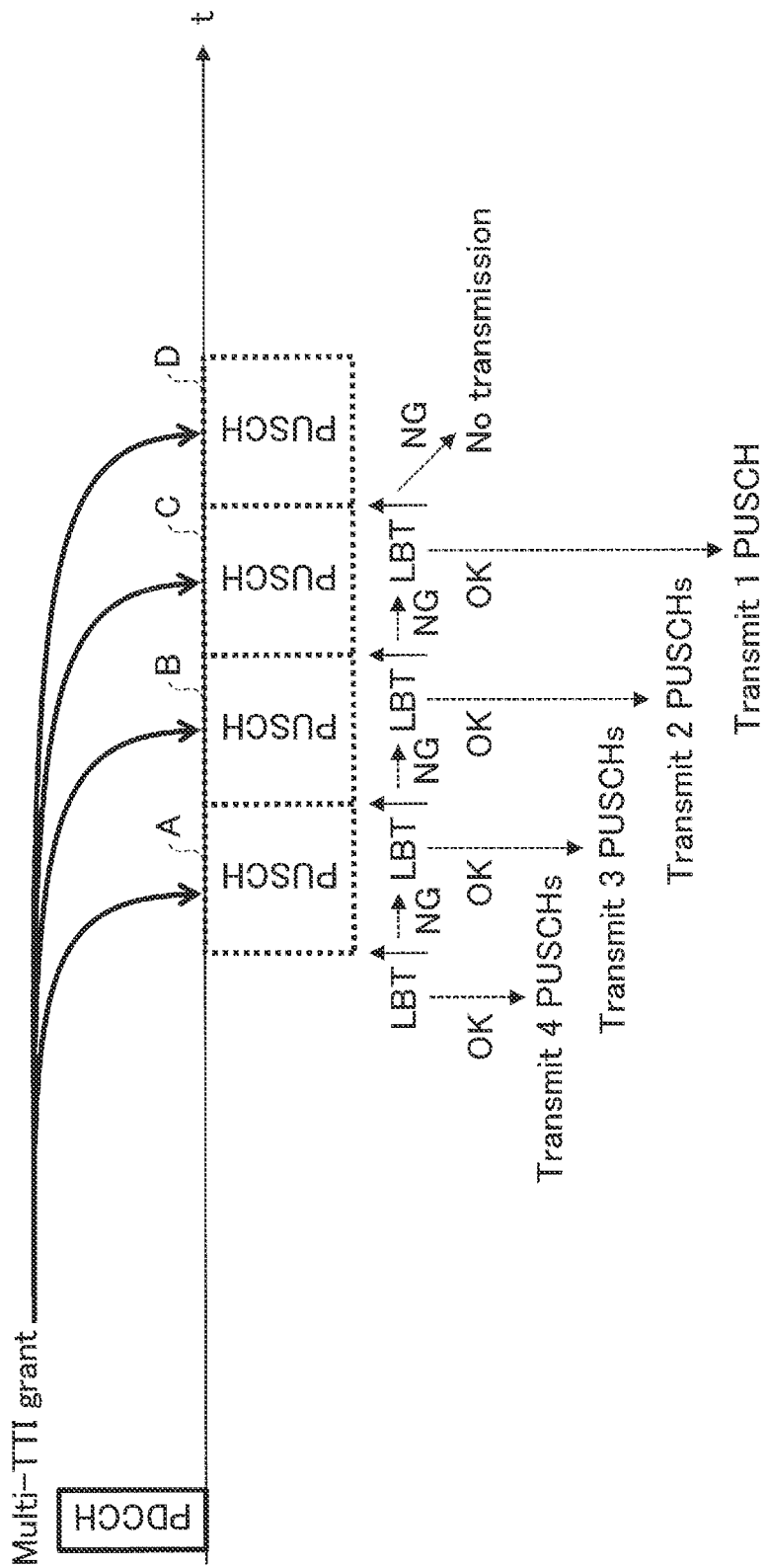
FIG. 3 is a diagram for describing a multi-TTI grant.

FIG. 3 is a diagram for describing a multi-TTI grant. In release 16NR-U, use of a multi-TTI (Transmission Time Interval) grant to schedule multiple PUSCHs over multiple slots/minislots in one DCI (Downlink Control Information) is assumed. Note that "scheduling" may be replaced with "allocating".

By using a multi-TTI grant, multiple consecutive PUSCHs that transmit separate TBs (Transport Blocks) are scheduled. One TB is mapped to one slot or one minislot, and transmitted in one PUSCH. One HARQ (Hybrid automatic repeat request) process is allocated to the one PUSCH to transmit the one TB.

For multiple PUSCHs scheduled by one DCI, signaling is executed for each NDI (New data indicator) and RV (Redundancy version) PUSCH with the one DCI. Also, a HARQ process ID indicated by the DCI is applied to the first scheduled PUSCH, and for subsequent PUSCH HARQ process IDs, values incremented one by one is applied in the order of the PUSCHs.

FIG. 3 illustrates an example of operations of the terminal 20 that receives a multi-TTI grant. In the example in FIG. 3, the multi-TTI grant schedules four slots of PUSCHs.

The terminal 20 executes LBT before a slot scheduled for a first PUSCH indicated by A, and if the LBT is OK, transmits data in the four consecutive PUSCHs. In the case where the first LBT is NG, the terminal 20 executes the LBT before a slot scheduled for a PUSCH indicated by B, and if the LBT is OK, transmits data in the three consecutive PUSCHs. Thereafter, similar operations are executed. In the case where the LBT is executed before a slot scheduled for the last PUSCH indicated by D, and if it is NG, no transmission is executed.

For example, PUSCH scheduling may be supported by one DCI for multiple slots or minislots including multiple consecutive PUSCHs that may include multiple separated TBs. Also, for example, DCI for signaling multiple PUSCHs may include NDI and RV. Also, for example, CBG (Code block group)-based retransmission may be supported in scheduling of multiple PUSCHs, and by using fields of DCI, signaling may be executed: for each of one or more PUSCHs to be retransmitted; for each PUSCH; or for each of fixed numbers of PUSCHs. Also, for example, a HARQ process ID signaled by the DCI may be applied to the first scheduled PUSCH, and may be incremented one by one for the subsequent PUSCHs.

Also, for example, allocated resources in the time domain in which PUSCHs are scheduled, may be expanded. For example: the range between the start symbol position and the end symbol position may be expanded; resources allocated consecutively in the time domain may be expanded; multiple PUSCHs may be arranged in the first slot; or multiple start symbol positions may be supported in the COT initiated by a terminal.

Also, in NR-U, an LBT gap based on the CP extension (Cyclic Prefix extension) has been discussed for UL transmission executed by a terminal. For example, at least for a CP extension before transmitting a PUSCH (Physical Uplink Shared Channel) that is dynamically scheduled, the CP extension may be placed in a symbol prior to the PUSCH allocation indicated by an SLIV (Start and Length Indicator). The period of CP extension to be supported may be any one of the following 1)-4).

1) 0 (i.e., no CP extension)
2) C1×symbol length−25 μs
3) C2×symbol length−16 μs−TA (Timing Advance)
4) C3×symbol length−25 μs C1, C2, and C3 described above may be values configured according to SCS (SubCarrier spacing). For example, in the case where SCS is 15 kHz or 30 kHz, the configuration may be fixed as C1=1. Also, for example, in the case where SCS is 60 kHz, the configuration may be fixed as C1=2. Note that C2 or C3 may be configured to be fixed based on the TA value for each SCS, or may be derived implicitly.

Note that a value N2 used for calculating a minimum latency from a UL grant to PUSCH transmission may be relaxed taking the CP extension into account. Note that the CP extension in a certain SCS may have a limit of less than or equal to one symbol, or may exceed one symbol. Note that the CP extension described above may be applied to the other UL transmission. Note that the number of the CP extension periods, which is dynamically signaled to the terminal 20, may be configurable.

Also, C2 and C3 may be configured specifically to the terminal 20 by RRC signaling. C2 and C3 do not have to limit the maximum TA used in a cell. Note that by the RRC signaling, C2 and C3 to be configured to have values among 1 to 28 in the case where SCS is 30 kHz. Also, by the RRC signaling, C2 and C3 to be configured to have values among 2 to 28 in the case where SCS is 60 kHz. Note that other specifications do not need to be changed by the configuration related to C2 and C3 described above.

With respect to a UL grant by non-fallback DCI, the following operations 1)-4) may be executed. Note that the non-fallback DCI format corresponds to, for example, DCI format 1_1 and DCI format 0_1 in an NR system. The non-fallback DCI format is, for example, a DCI format having a size greater than those of DCI format 1_0 and DCI format 0_0 that are fallback DCI formats; and unlike the fallback DCI format, the size is changed depending on the configuration. In the following, "*" denotes multiplication.

1) LBT type, CP extension value, and CAPC (Channel Access Priority Class) may be jointly encoded (i.e., an index is associated with a combination of them), to be included in the UL grant.

2) A combination of LBT type, CP extension value, and CAPC may be configured to the terminal 20 by RRC signaling specific to the terminal 20.

3) Among combinations of LBT types {Cat1−16 μs, Cat2−16 μs, Cat2−25 μs, Cat4}; CP extensions {0, C1*symbol length−25 μs, C2*symbol length−16 μs−TA, C3*symbol length−25 μs−TA}; and CAPC{1, 2, 3, 4}, combinations of (Cat2−25 μs, C2*symbol length−16 μs−TA); (Cat1−16 μs, C3*symbol length−25 μs−TA); (Cat2−16 μs, C3*symbol length−25 μs−TA); and (Cat2−16 μs or Cat2−16 μs, C1*symbol length−25 μs) need not be supported by the RRC configuration.

4) The corresponding bit field of DCI may have a length of up to 6 bits. The length of the bit field may be determined depending on the number of combinations configured by the RRC signaling with respect to the terminal 20.

As for a non-fallback DL allocation in which UL transmission (e.g., PUCCH) is scheduled, the following operations 1)-5) may be executed.

1) LBT type and CP extension value may be jointly encoded, to be included in the DL allocation.

2) The highest CAPC may be assumed all the time.

3) A combination of LBT type and CP extension value may be configured in the terminal 20 by RRC signaling specific to the terminal 20.

4) Among combinations of LBT types {Cat1−16 μs, Cat2−16 μs, Cat2−25 μs, Cat4}; and CP extensions {0, C1*symbol length−25 μs, C2*symbol length−16 μs−TA, C3*symbol length−25 μs−TA}, combinations of (Cat2−25 μs, C2*symbol length−16 μs−TA); (Cat1−16 μs, C3*symbol length−25 μs−TA); (Cat2−16 μs, C3*symbol length−25 μs−TA); and (Cat2−16 μs or Cat2−16 μs, C1*symbol length−25 μs) may not be supported by the RRC configuration.

5) The corresponding bit field of DCI may have a length of up to 4 bits. The length of the bit field may be determined depending on the number of combinations configured by the RRC signaling with respect to the terminal 20.

Meanwhile, in a UL grant by the fallback DCI, LBT type, CP extension value, and CAPC may be jointly encoded in two bits, to be included in the UL grant. Note that combinations of LBT type, CP extension value, and CAPC to be supported may be defined in advance in the specifications.

Also, in a fallback DL allocation in which UL transmission (e.g., PUCCH) is scheduled, LBT type and CP extension value may be jointly encoded in two bits, to be included in the UL grant. Note that combinations of LBT type and CP extension value to be supported may be defined in advance in the specifications.

Here, as the mechanism of LBT, FBE (Frame-Based Equipment) and LBE (Load-Based Equipment) have been discussed. Differences between the two include: the frame configuration used for transmission and reception; channel occupancy time; and the like. The FBE has a configuration in which timing of transmission and reception related to the LBT is fixed. On the other hand, the LBE does not have a configuration in which transmission and reception related to the LBT is not fixed in the time axis direction, and the LBT is executed depending on demand. Specifically, the FBE has a fixed frame cycle, and as a result of carrier sensing for a certain period of time in a predetermined frame (may also be referred to as LBT duration or the like), the FBE executes transmission if the channel is available, or if the channel is unavailable, waits without executing transmission until the carrier sensing timing in the next frame.

On the other hand, with respect to LBE, if the channel is not available as a result of carrier sensing (initial Clear Channel Assessment: CCA), the LBE extends the carrier sensing time, and executes an ECCA (Extended CCA) procedure in which the carrier sensing is executed continuously until the channel becomes available. In the LBE, random backoff is required to avoid collisions appropriately.

In the case where the LBT is operated with the LBE, signaling of the LBT type and CP extension value for both of the fallback DL allocation and the fallback UL grant may be executed using, for example, Table 1.

TABLE 1

| LBT Type | CP extension |
|---|---|
| Cat1 16 μs | C2*symbol length - 16 us - TA |
| Cat2 25 μs | C3*symbol length - 25 us - TA |
| Cat2 25 μs | C1*symbol length - 25 us |
| Cat4 | 0 |

"Cat1" shown in Table 1 corresponds to category 1, "Cat2" corresponds to category 2, and "Cat4" corresponds to category 4. As shown in Table 1, in the case where the LBT type is "Cat1–16 μs", the CP extension value may be "C2*symbol length–16 μs–TA". Also, in the case where the LBT type is "Cat2–25 μs", the CP extension value may be "C3*symbol length–25 μs–TA". Also, in the case where the LBT type is "Cat2–25 μs", the CP extension value may be "C1*symbol length–25 μs–TA". Also, in the case where the LBT type is "Cat4", the CP extension value may be "0".

Note that CAPC does not need to be indicated explicitly. As for the UL grant, the terminal 20 may assume CAPC=4 used by the base station 10 to obtain CO. Also, in the case of COT initiated by the terminal 20, namely, category 4, the terminal 20 may select CAPC by itself. Note that mapping between the CAPC and the traffic class may be substantially the same as mapping defined for UL-CG (Configured Grant) transmission. Note that in the case where LBT of category 4 is used, CAPC having the highest priority among PUCCHs associated with the DL allocation may be used.

In the case where the LBT is operated with the FBE, the terminal 20 that has been indicated that the LBT type is "Cat2–25 μs" or "Cat4", may measure one 9-μs slot for carrier sensing within a period of 25 μs.

Also, as for RAR (Random access response), the terminal 20 may use the same table of the LBT type and CP extension value (e.g., Table 1) and the same CAPC selection method as those for the UL grant by the fallback DCI. For the operations described above, two bits may be signaled via a RAR (i.e., a PDSCH). In the case where the terminal 20 multiplexes user plane data in a PUSCH, the terminal may assume that the base station 10 has used CAPC=4 to obtain CO. Also, in the case of COT initiated by the terminal 20, namely, category 4, the terminal 20 may select CAPC by itself. Note that mapping between the CAPC and the traffic class may be substantially the same as mapping defined for UL-CG transmission. Also, the field included in the RAR that indicates the resource allocation in the frequency domain is reduced to contain the two bits.

In the case of a CP extension of a first OFDM symbol 1 allocated to the PUSCH transmission, $T_{ext}$ [sec] corresponds to the period of the CP extension. Table 2 shows examples of $T_{ext}$ with indices for respective SCS.

TABLE 2

| Index | μ = 0 | μ = 1 | μ = 2 |
|---|---|---|---|
| 0 | — | — | — |
| 1 | $T_{symb,l}^{\mu} - 25 \cdot 10^{-6}$ | $T_{symb,l}^{\mu} - 25 \cdot 10^{-6}$ | $2T_{symb,l}^{\mu} - 25 \cdot 10^{-6}$ |
| 2 | $C_2 T_{symb,l}^{\mu} - 16 \cdot 10^{-6} - T_{TA}$ | $C_2 T_{symb,l}^{\mu} - 16 \cdot 10^{-6} - T_{TA}$ | $C_2 T_{symb,l}^{\mu} - 16 \cdot 10^{-6} - T_{TA}$ |
| 3 | $C_3 T_{symb,l}^{\mu} - 25 \cdot 10^{-6} - T_{TA}$ | $C_3 T_{symb,l}^{\mu} - 25 \cdot 10^{-6} - T_{TA}$ | $C_3 T_{symb,l}^{\mu} - 25 \cdot 10^{-6} - T_{TA}$ |

μ=0 shown in Table 2 corresponds to 15 kHz SCS: μ=1 corresponds to 30 kHz SCS: μ=2 corresponds to 60 kHz SCS: $T_{symb}$, $1^{\mu}$ correspond to the symbol length of SCS being μ and the symbol position being 1; and $T_{TA}$ corresponds to the timing advance value. As shown in Table 2, $T_{ext}$ corresponding to the index 0 is not defined.

The index 1 corresponds to "symbol length–25*10$^{-6}$" for 15 kHz SCS, "symbol length–25*10$^{-6}$" for 30 kHz SCS, and "2*symbol length–25*10$^{-6}$" for 60 kHz SCS.

The index 2 corresponds to "C2*symbol length–16* 10$^{-6}$–$T_{TA}$" for any case of 15 kHz SCS, 30 kHz, and 60 kHz. In other words, the CP extension is determined according to the timing advance value.

The index 3 corresponds to "C3*symbol length–16* 10$^{-6}$–$T_{TA}$" for any case of 15 kHz SCS, 30 kHz, and 60 kHz. The CP extension is determined as in the case of the index 2, namely, according to the timing advance value.

Note that C2 and C3 may be integer values among 1 to 28 in the case of 15 kHz SCS or 30 kHz SCS. C2 and C3 may be integer values among 2 to 28 in the case of 60 kHz SCS.

Here, while the CP extension is applied as described above, depending on the communication state, it has been necessary for the terminal 20 to specify the period of the CP extension before the RRC configuration is executed. The communication state corresponds to, for example, a timing when allocating RAR, a UL grant by fallback DCI, and a DL by fallback DCI. In this communication situation, the values of C2 and C3 used for the UL transmission is unknown to the terminal 20.

Thereupon, in UL transmission in NR-U, the CP extension value may be determined appropriately even before the RRC configuration is executed.

Figure 4:
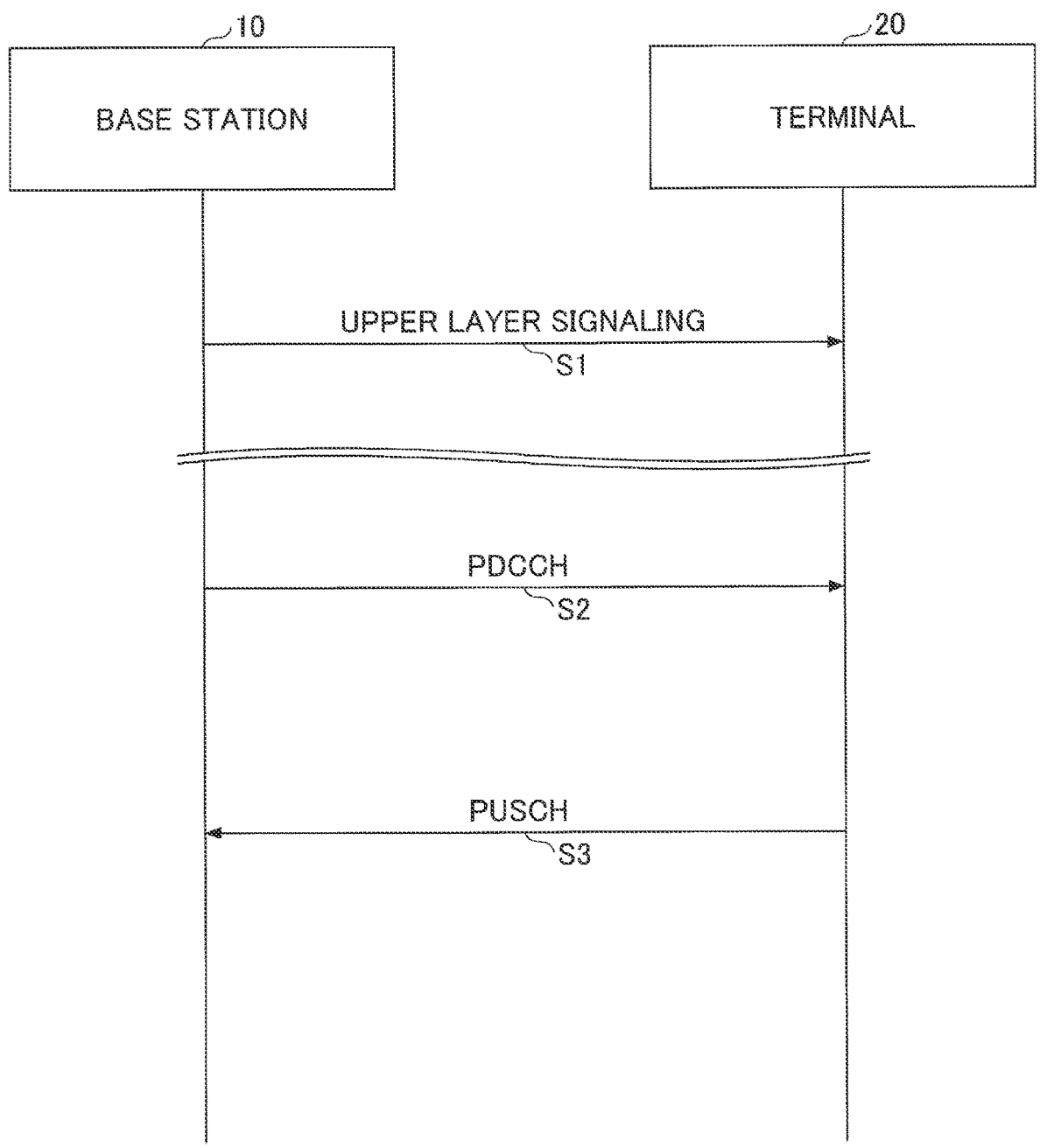
FIG. 4 is a sequence chart for describing an example of signaling in an embodiment according to the present invention.

FIG. 4 is a sequence chart for describing an example of signaling in an embodiment according to the present invention. The base station 10 may issue a command to transmit a PUSCH and/or a PUCCH at Steps S1 and S2 to the terminal 20, or configure a transmission opportunity. The terminal 20 may determine the CP extension value appropriately, for example, before executing the RRC configuration at Step S1.

At Step S1, the base station 10 indicates, to the terminal 20, the configuration associated with the PUSCH and/or the PUCCH via upper layer signaling. For example, the configuration related to the CP extension may be indicated.

At Step S2, the base station 10 transmits a UL grant by DCI to the terminal 20 via a PDCCH. Next, the terminal 20 transmits data to the base station via a PUSCH determined based on the received DCI (S3). In the case where the CP extension value has been indicated by the DCI, the terminal 20 may apply the CP extension to the PUSCH, to execute transmission.

Also, as another example, at Step S2, the base station 10 transmits a DL allocation by the DCI to the terminal 20 via a PDCCH. Next, the terminal 20 transmits uplink control information (UCI) to the base station 10 via a PUCCH determined based on the received DCI (S3). In the case where the CP extension value has been indicated by the DCI, the terminal 20 may apply the CP extension to the PUCCH, to execute transmission.

Also, as another example, at Step S2, the base station 10 transmits a RAR to the terminal 20 via a PDSCH. Next, the terminal 20 transmits data to the base station 10 via a PUSCH determined based on the received RAR (S3). In the case where the CP extension value has been indicated by the RAR, the terminal 20 may apply the CP extension to the PUSCH, to execute transmission.

Figure 5:
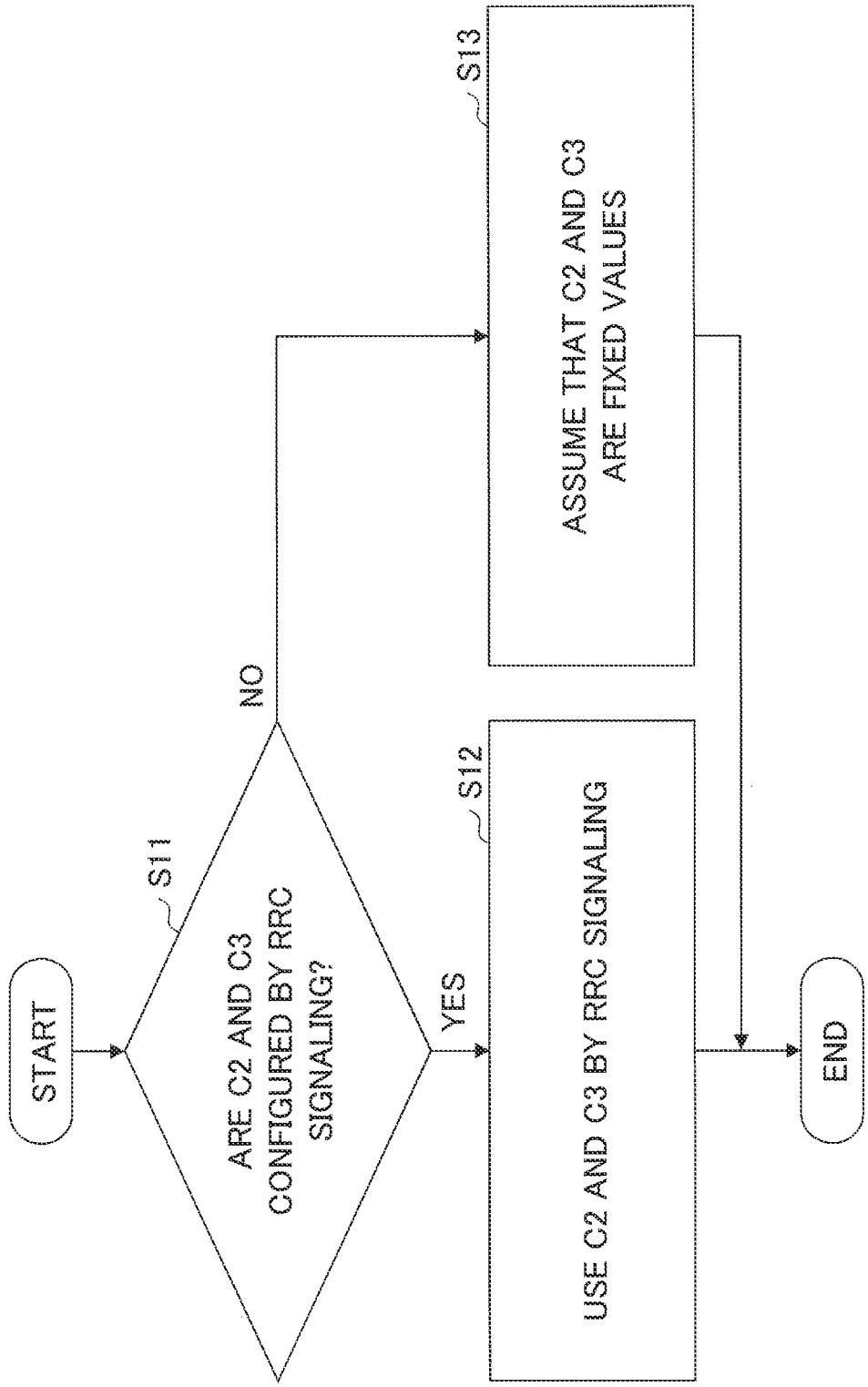
FIG. 5 is a flow chart for describing an example (1) of operations of a terminal 20 in an embodiment according to the present invention.

FIG. 5 is a flow chart for describing an example (1) of operations of the terminal 20 in an embodiment according to the present invention. At Step S11, the terminal 20 determines whether or not C2 and C3 has been configured by the RRC signaling. If configured (YES at S11), the process proceeds to Step S12, or if not configured (NO at S11), the process proceeds to Step S13.

At Step S12, the terminal 20 uses C2 and C3 in the RRC signaling to determine the CP extension value. On the other hand, at Step S13, the terminal determines the CP extension value assuming that C2 and C3 are fixed values defined in advance.

For example, at Step S13, fixed values of C2 and C3 may be selected from among integer values from 1 to 28 in the case of 15 kHz SCS or 30 kHz SCS, or from integer values from 2 to 28 in the case of 60 kHz SCS.

Also, for example, at Step S13, assuming that C2 takes a fixed defined value, in the case where the C2*symbol length is−16 μs−TA<0, the CP extension value may be assumed to be zero. For example, at Step S13, assuming that C3 takes a fixed defined value, in the case where the C2*symbol length is−16 μs−TA<0, the CP extension value may be assumed to be zero.

Figure 6:
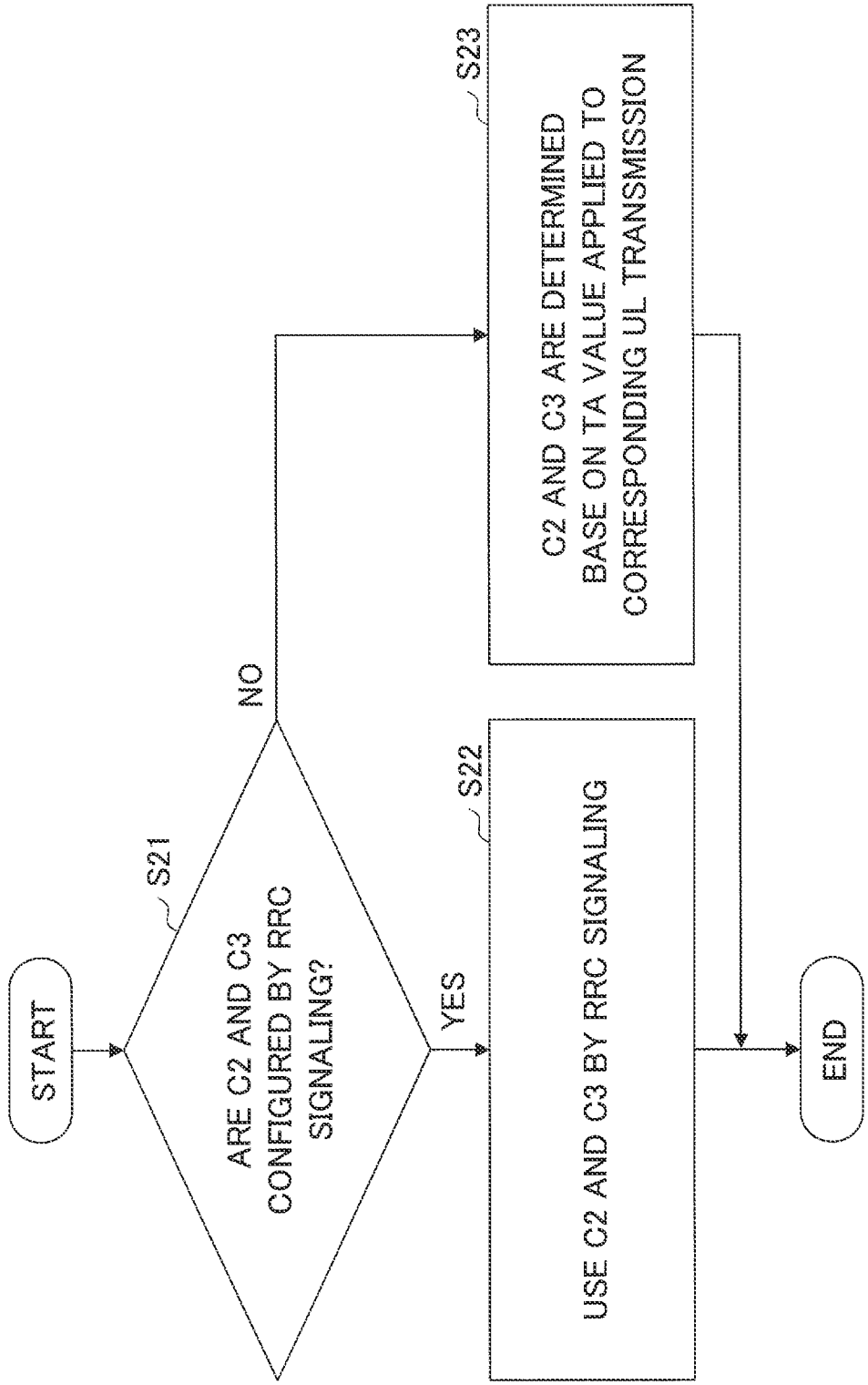
FIG. 6 is a flow chart for describing an example (2) of operations of a terminal 20 in an embodiment according to the present invention.

FIG. 6 is a flow chart for describing an example (2) of operations of a terminal 20 in an embodiment according to the present invention. At Step S21, the terminal 20 determines whether or not C2 and C3 has been configured by the RRC signaling. If configured (YES at S21), the process proceeds to Step S22, or if not configured (NO at S21), the process proceeds to Step S23.

At Step S22, the terminal 20 uses C2 and C3 in the RRC signaling to determine the CP extension value. On the other hand, at Step S23, the terminal determines C2 and C3 from the TA value applied to the corresponding UL transmission, to determine the CP extension value.

For example, C2 may be a maximum value that satisfies "C2*symbol length−16 μs−TA<symbol length". C3 may be a maximum value that satisfies "C3*symbol length−25 μs−TA<symbol length".

Also, for example, C2 may be a minimum value that satisfies "0<C2*symbol length−16 μs−TA". C3 may be a minimum value that satisfies "0<C3*symbol length−25 μs−TA".

Figure 7:
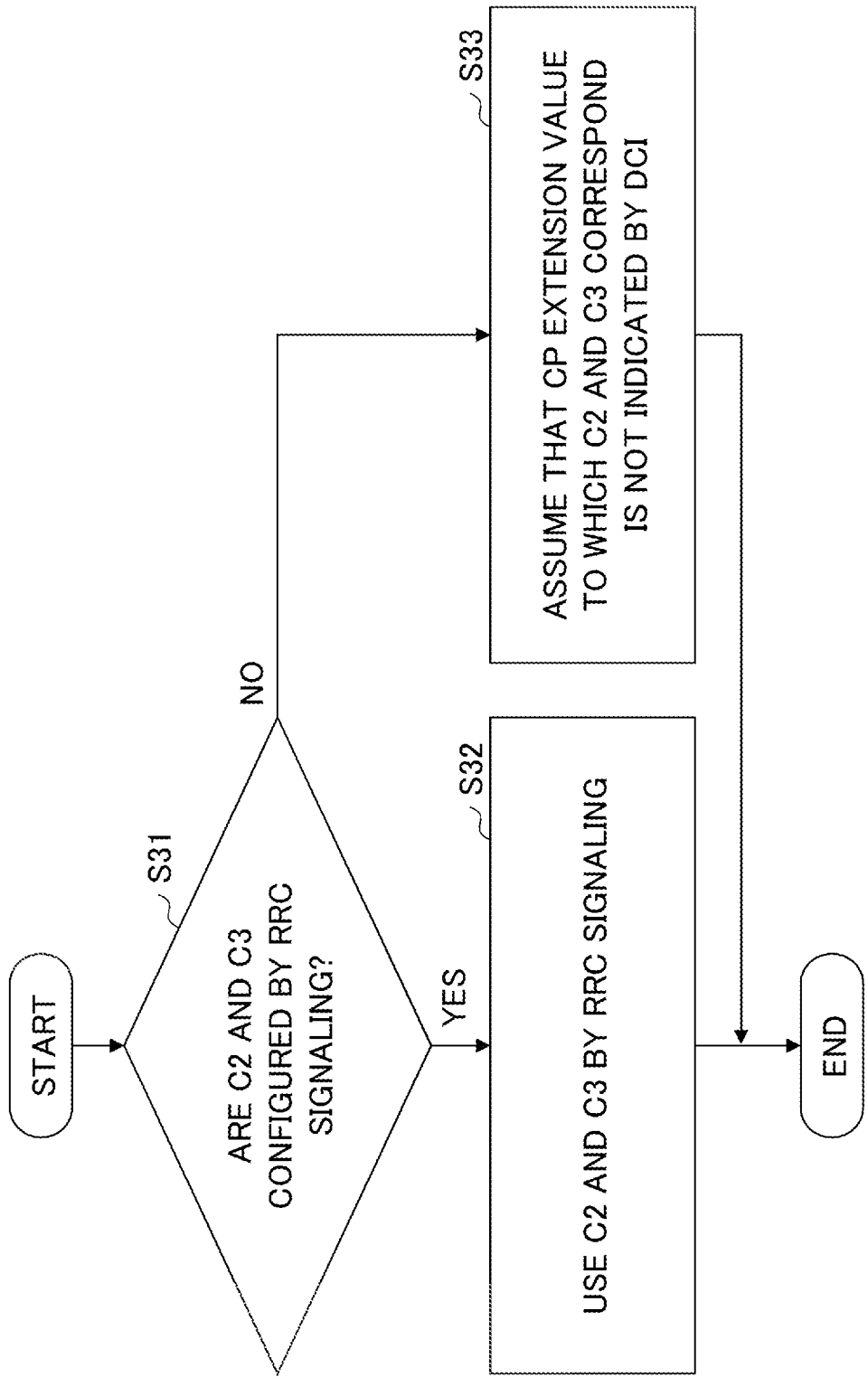
FIG. 7 is a flow chart for describing an example (3) of operations of a terminal 20 in an embodiment according to the present invention.

FIG. 7 is a flow chart for describing an example (3) of operations of a terminal 20 in an embodiment according to the present invention. At Step S21, the terminal 20 determines whether or not C2 and C3 has been configured by the RRC signaling. If configured (YES at S21), the process proceeds to Step S22, or if not configured (NO at S21), the process proceeds to Step S23.

At Step S22, the terminal 20 uses C2 and C3 in the RRC signaling to determine the CP extension value. On the other hand, at Step S23, the terminal may assume that CP extension value corresponding to C2 and C3 is not indicated by the DCI. Table 3 shows examples of CP extension values indicated by DCI.

TABLE 3

| Bit field mapped to index | Channel Access Type | CP extension |
| --- | --- | --- |
| 0 | Type2C-ULChannelAccess defined in [subclause 4.2.1.2.3 in 37.213] | C2*symbol length - 16 us - TA |
| 1 | Type2A-ULChannelAccess defined in [subclause 4.2.1.2.1 in 37.213] | C3*symbol length - 25 us - TA |
| 2 | Type2A-ULChannelAccess defined in [subclause 4.2.1.2.1 in 37.213] | C1*symbol length - 25 us |
| 3 | Type1-ULChannelAccess defined in [subclause 4.2.1.1 in 37.213] | 0 |

As shown in Table 3, CP extension values corresponding to C2 and C3 are indices "0" and "1". Therefore, the terminal 20 may assume that the indices "0" and "1" are not indicated in an indication of a CP extension value by the DCI. Further, the length of the bit field may be configured to be 1 bit, and the index "2" or "3" may be indicated.

Note that the channel access type (LBT type) shown in Table 3 is a type of channel access method that uses a random period or a fixed period to determine that a sensed slot is idle before the terminal 20 transmits UL. Channel access type 1 corresponds to "Cat4"; channel access type 2A corresponds to "Cat2-25 μs"; and channel access type 2C corresponds to "Cat1-16 μs".

Figure 8:
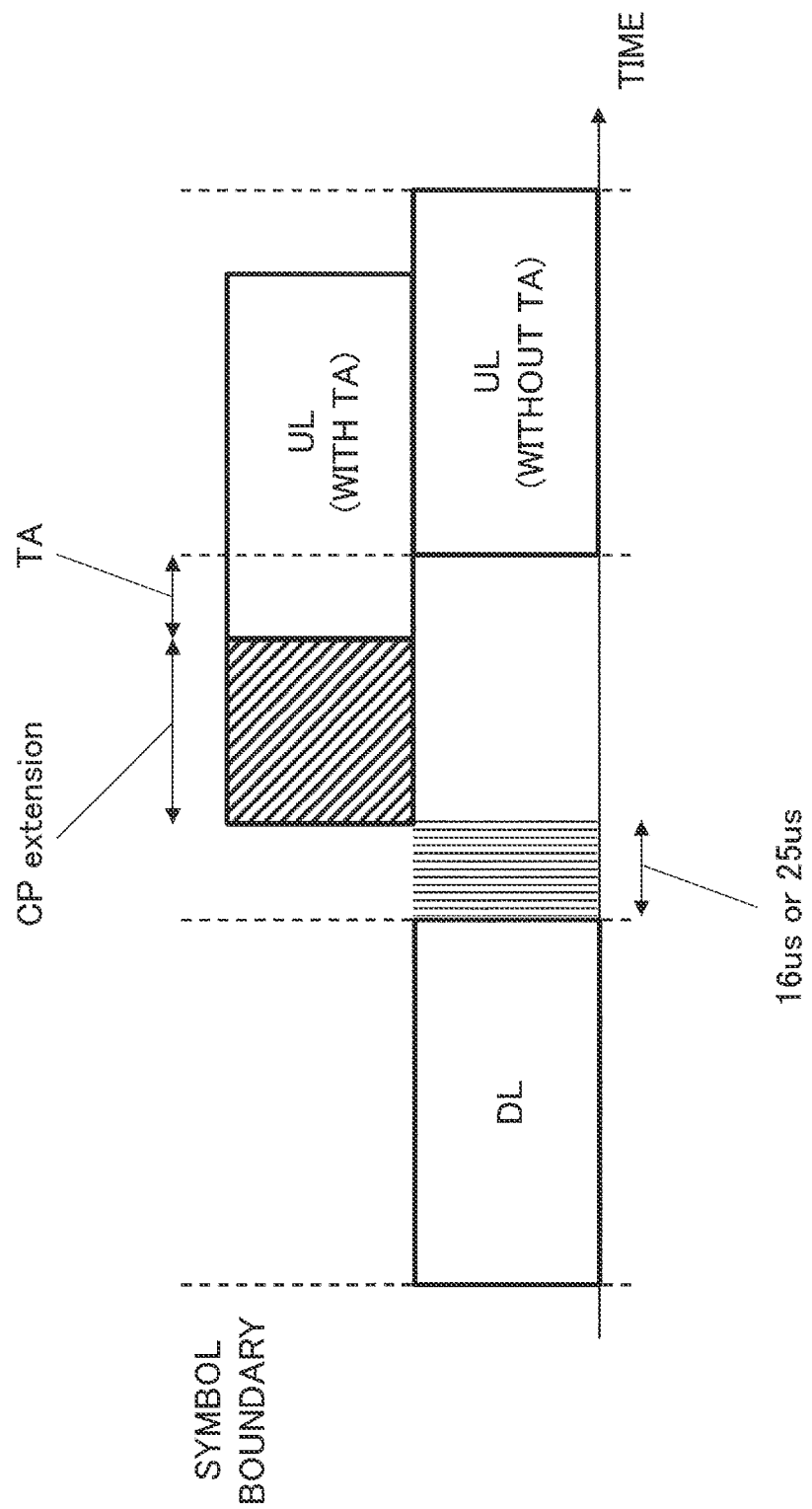
FIG. 8 is a diagram for describing an example of a CP extension in an embodiment according to the present invention.

FIG. 8 is a diagram illustrating an example of a CP extension in an embodiment according to the present invention, where 16 μs or 25 μs+TA is less than or equal to the length of one symbol. As illustrated in FIG. 8, in the case where CP extension value is configured, 16 μs or 25 μs+CP extension value+TA corresponds to the length of one symbol. In other words, CP extension value=the length of one symbol−16 μs or 25 μs−TA. In the case of configuring a further greater CP extension value, the CP extension value may be a value obtained by increasing the first term of the right-hand side of the above formula, by units of symbol.

According to the application example described above, even in the case where C2 and C3 are not configured by the RRC signaling, the terminal 20 can determine C2 and C3 to determine the CP extension value, and execute UL transmission to which the CP extension is applied. Also, even in the case where C2 and C3 are not configured by the RRC signaling, assuming that the CP extension value using C2 and C3 is not indicated, the terminal 20 can obtain the CP extension value with a small bit length from the notice by the base station 10.

In other words, in a radio communication system, a value of a CP extension (Cyclic Prefix Extension) can be determined and applied to communication.

(Apparatus Configuration)

Next, an example of a functional configuration of the base station 10 and the terminal 20 to execute the processes and operations described above, will be described. The base station 10 and the terminal 20 include functions of implementing the application examples described above. However, each of the base station 10 and the terminal 20 may include only part of the functions of the application examples.

<Base Station 10>

Figure 9:
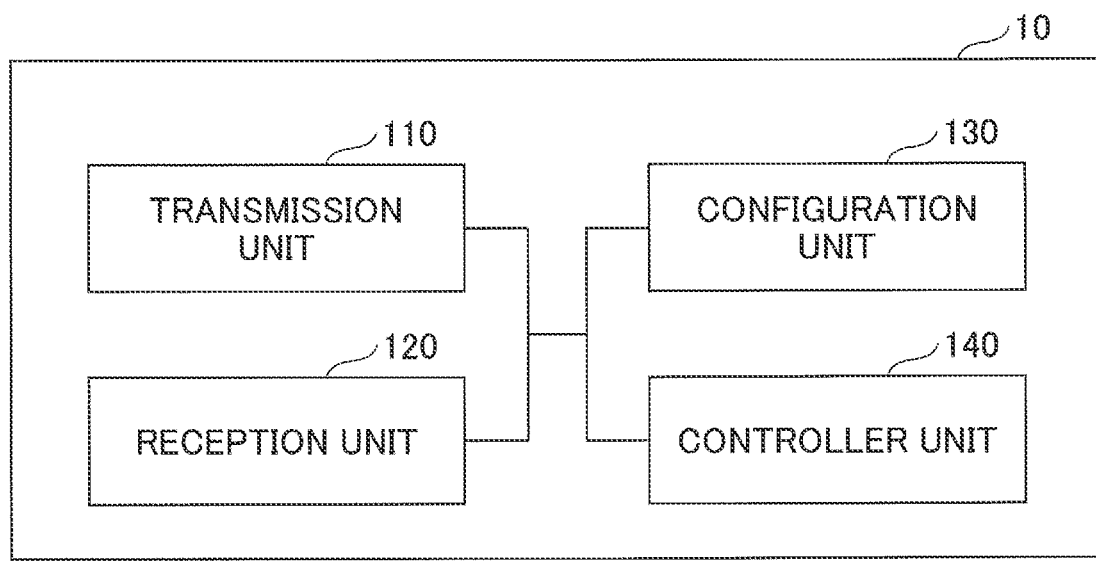
FIG. 9 is a diagram illustrating an example of a functional configuration of a base station 10 according to an embodiment of the present invention.

FIG. 9 is a diagram illustrating an example of a functional configuration of the base station 10 in an embodiment according to the present invention. As illustrated in FIG. 9, the base station 10 includes a transmission unit 110, a reception unit 120, a configuration unit 130, and a control unit 140. The functional configuration illustrated in FIG. 9 is merely an example. Functional partitioning and names of the functional units may be determined discretionarily as long as operations can be executed according to the embodiments of the present invention.

The transmission unit 110 includes a function of generating a signal to be transmitted to the terminal 20 and transmitting the signal by radio. Also, the transmission unit 110 transmits messages between network nodes to the other network nodes. The reception unit 120 includes a function of receiving various signals transmitted from the terminal 20 and obtaining information on an upper layer, for example, from the received signals. Also, the transmission unit 110 has functions of transmitting NR-PSS, NR-SSS, NR-PBCH, DL/UL control signals, and the like to the terminal 20. Also, the reception unit 120 receives messages between network nodes from the other network nodes.

The configuration unit 130 stores configuration information configured in advance, and various items of configuration information to be transmitted to the terminal 20. The contents of the configuration information include, for example, configuration items related to communication of NR-U.

The control unit 140 executes control related to a UL grant as described in the application example. A functional unit for transmitting signals in the control unit 140 may be included in the transmission unit 110, and a functional unit for receiving signals in the control unit 140 may be included in the reception unit 120.

<Terminal 20>

Figure 10:
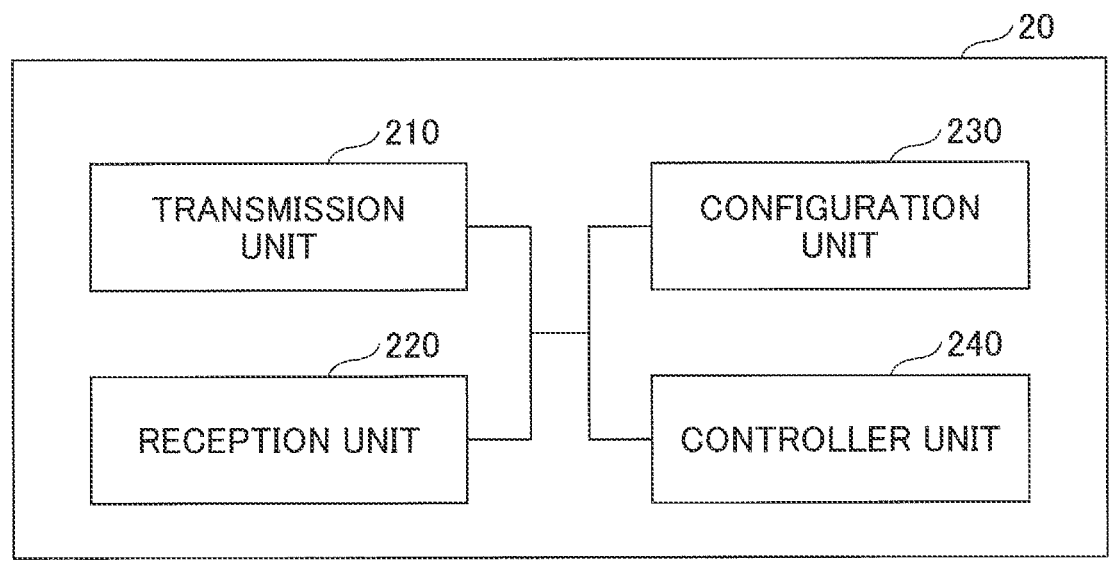
FIG. 10 is a diagram illustrating an example of a functional configuration of a terminal according to an embodiment of the present invention.

FIG. 10 is a diagram illustrating an example of a functional configuration of the terminal 20 in an embodiment according to the present invention. As illustrated in FIG. 10, the terminal 20 includes a transmission unit 210, a reception unit 220, a configuration unit 230, and a control unit 240. The functional configuration illustrated in FIG. 10 is merely an example. Functional partitioning and names of the functional units may be determined discretionarily as long as operations can be executed according to the embodiments of the present invention.

The transmission unit 210 generates a transmission signal from transmission data, to transmit the transmission signal by radio. The reception unit 220 receives various signals by radio and obtains a signal of an upper layer from a received signal on the physical layer. Also, the reception unit 220 has functions of receiving NR-PSS, NR-SSS, NR-PBCH, DL/UL/SL control signals and the like transmitted from the base station 10. Also, for example, the transmission unit 210 transmits a PSCCH (Physical Sidelink Control Channel), PSSCH (Physical Sidelink Shared Channel), PSDCH (Physical Sidelink Discovery Channel), PSBCH (Physical Sidelink Broadcast Channel), or the like to other terminals 20 as D2D communication, and the reception unit 220 receives a PSCCH, PSSCH, PSDCH, or PSBCH from another terminal 20.

The configuration unit 230 stores various items of configuration information received from the base station 10 by the reception unit 220. The configuration unit 230 also stores configuration information configured in advance. The contents of the configuration information include, for example, configuration items related to communication of NR-U.

The control unit 240 executes control of transmission with LBT based on a UL grant, as described in the application example. Also, the control unit 240 controls UL transmission to which the CP extension is applied according to the configuration. A functional unit for transmitting signals in the control unit 240 may be included in the transmission unit 210, and a functional unit for receiving signals in the control unit 240 may be included in the reception unit 220.

(Hardware Configuration)

The block diagrams (FIGS. 9 and 10) used for describing the above embodiments show blocks in functional units. These functional blocks (components) are implemented by any combination of hardware and/or software. Further, the method of implementing the functional blocks is not limited in particular. In other words, each functional block may be implemented by using one device that is physically or logically coupled, or two or more devices that are physically or logically separated may be connected directly or indirectly (e.g., by wire or by radio) so as to implement the functional block. The functional blocks may be implemented by one or more of the above devices in combination with software.

Functions include, but are not limited to, judgment, decision, determination, calculation, computation, processing, derivation, investigation, search, confirmation, reception, transmission, output, access, resolution, selection, choice, establishment, comparison, assumption, expectation, deeming, broadcasting, notifying, communicating, forwarding, configuring, reconfiguring, allocating, mapping, and assigning. For example, a functional block (component) that implements a function of transmission may be referred to as a transmitting unit or a transmission unit. In any case, as described above, implementation methods are not limited in particular.

Figure 11:
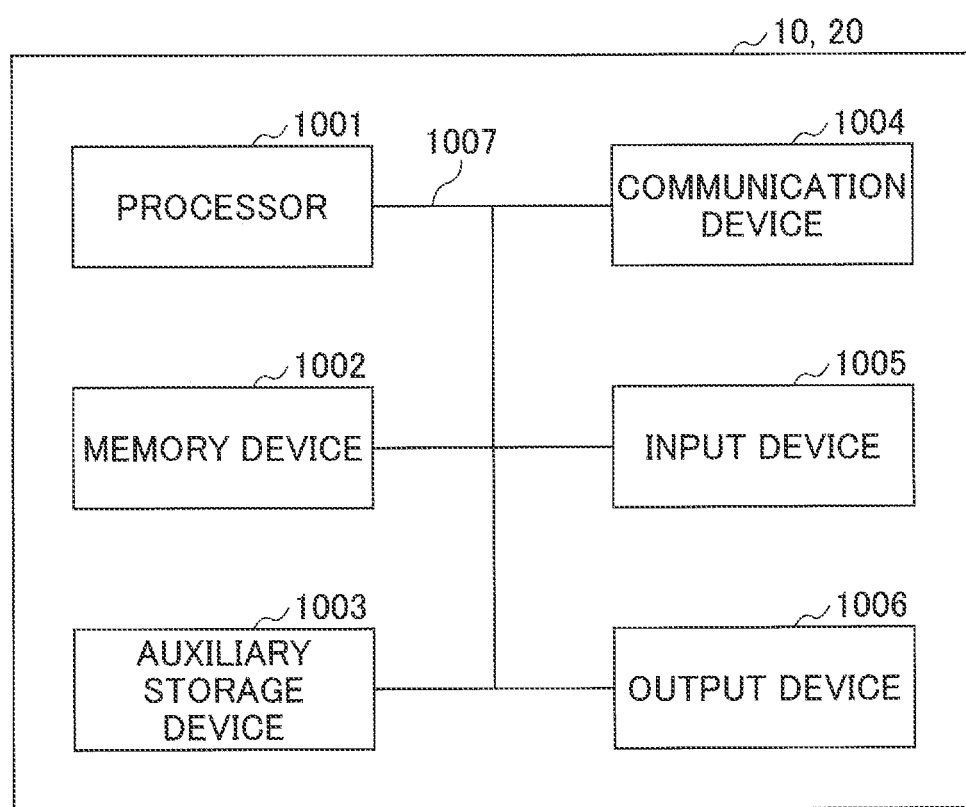
FIG. 11 is a diagram illustrating an example of a hardware configuration of the base station 10 or the terminal 20 according to an embodiment of the present invention.

For example, the base station 10, the terminal 20, or the like in an embodiment of the present disclosure may function as a computer that processes a radio communication method of the present disclosure. FIG. 11 is a diagram illustrating an example of a hardware configuration of the base station 10 and the terminal 20 according to an embodiment of the present disclosure. The base station 10 and terminal 20 described above may be physically configured as a computer device that includes a processor 1001, a memory device 1002, an auxiliary storage device 1003, a communication device 1004, an input device 1005, an output device 1006, and a bus 1007.

Note that in the following description, the term "apparatus" can be read as a circuit, device, unit, or the like. The hardware configuration of the base station 10 and the terminal 20 may be configured to include one or more of the devices illustrated in the drawings or may be configured without including some of the devices.

Each function in the base station 10 and the terminal 20 is implemented by loading predetermined software (a program) on the hardware such as the processor 1001 and the memory device 1002 so as to cause the processor 1001 to execute operations, to control communication by the communication device 1004, and to control at least one of reading and writing data in the memory device 1002 and the auxiliary storage device 1003.

The processor 1001 controls the entire computer, for example, by causing an operating system to run. The processor 1001 may be constituted with a central processing unit (CPU) that includes interfaces with peripheral devices, a control unit, an arithmetic/logic unit, registers, and the like. For example, the control unit 140, the control unit 240, and the like described above may be implemented by the processor 1001.

The processor 1001 also reads a program (a program code), a software module, data, and the like from at least one of the auxiliary storage device 1003 and the communication device 1004 to the memory device 1002 to perform various processes in accordance with these. As a program, a program that causes the computer to execute at least some of the operations described in the above embodiments is used. For example, the control unit 140 of the base station 10 illustrated in FIG. 9 may be implemented by a control program that is stored in the storage device 1002 and runs on the processor 1001. Also, for example, the control unit 240 of the terminal 20 illustrated in FIG. 10 may be implemented by a control program that is stored in the storage device 1002 and runs on the processor 1001. Although the various processes described above are assumed to be executed by the single processor 1001, these may be executed simultaneously or sequentially by two or more processors 1001. The processor 1001 may be implemented by one or more chips. Note that the program may be transmitted from a network via a telecommunication line.

The memory device 1002 is a computer-readable recording medium, and may be constituted with, for example, at least one of a ROM (Read-Only Memory), an EPROM (Erasable Programmable ROM), an EEPROM (Electrically Erasable Programmable ROM), a RAM (Random Access Memory), and the like. The memory device 1002 may be referred to as a register, a cache, a main memory (a main memory device), or the like. The memory device 1002 is capable of storing a program (a program code), a software module, and the like that are executable to implement the communication method according to an embodiment of the present disclosure.

The auxiliary storage device 1003 is a computer-readable recording medium and may be constituted with, for example, at least one of an optical disk such as a CD-ROM (Compact Disc ROM), a hard disk drive, a flexible disk, an optical magnetic disk (e.g., a compact disk, a digital versatile disk, a Blu-ray (registered trademark) disk, a smart card, a flash memory (e.g., a card, a stick, and a key drive), a floppy (registered trademark) disk, a magnetic strip, and the like. The recording medium described above may be, for example, a database, a server, or any other suitable medium that includes at least one of the memory device 1002 and the auxiliary storage device 1003.

The communication device 1004 is hardware (a transceiver device) for communicating with computers via at least one of a wired network and a wireless network, and is also referred to as, for example, a network device, a network control unit, a network card, a communication module, and the like. The communication device 1004 may be configured to include, for example, a radiofrequency switch, a duplexer, a filter, a frequency synthesizer, and the like, for example, to implement at least one of a frequency division duplex (FDD) and a time division duplex (TDD). For example, a transmitting and receiving antenna, an amplifier, a transceiver, a transmission line interface, and the like may be implemented by the communication device 1004. The transceiver may be implemented by a transmission unit and a reception unit that are physically or logically separated.

The input device 1005 is an input device (e.g., a keyboard, a mouse, a microphone, a switch, a button, a sensor, etc.) to receive input from the outside. The output device 1006 is an output device (e.g., a display, a speaker, an LED lamp, etc.) to execute outputting to the outside. Note that the input device 1005 and the output device 1006 may have an integrated configuration (e.g., a touch panel).

Each of the devices such as the processor 1001 and the memory device 1002 is connected via the bus 1007 for communicating information. The bus 1007 may be configured by using a single bus or may be configured by using different buses between specific devices.

The base station 10 and the terminal 20 may also be configured to include hardware such as a microprocessor, a digital signal processor (DSP), an ASIC (Application Specific Integrated Circuit), a PLD (Programmable Logic Device), and an FPGA (Field Programmable Gate Array), and with such hardware, some of or all of the functional blocks may be implemented. For example, the processor 1001 may be implemented by using at least one of these hardware components.

Summary of Embodiments

As described above, according to the embodiments of the present invention, a terminal is provided that includes a reception unit configured to receive information for allocating uplink transmission from a base station; a control unit configured to determine a CP extension value in a case where a parameter for calculating the CP extension value is not configured by the base station upon receiving the information; and a transmission unit configured to execute the uplink transmission by applying the determined CP extension value.

According to the configuration described above, even in the case where C2 and C3 are not configured by the RRC signaling, the terminal 20 can determine C2 and C3 to determine the CP extension value, and execute UL transmission to which the CP extension is applied. Also, even in the case where C2 and C3 are not configured by the RRC signaling, assuming that CP extension value using C2 and C3 is not indicated, the terminal 20 can obtain the CP extension value from an indication by the base station 10 with a small bit length. In other words, in a radio communication system, a value of a CP extension (Cyclic Prefix Extension) can be determined and applied to communication.

The control unit may determine the parameter, and calculate, as the CP extension value, a period of time obtained by subtracting a period of time according to a timing advance value and a predetermined period of time, from a period of time being an integer multiple of a symbol length, the integer multiple being based on the determined parameter. According to the configuration, even in the case where C2 and C3 are not configured by the RRC signaling, the terminal 20 can determine C2 and C3 to determine the CP extension value, and execute UL transmission to which the CP extension is applied.

The control unit may determine the parameter to have a value specified in advance, to calculate the CP extension value, based on the determined parameter. According to the configuration, even in the case where C2 and C3 are not configured by the RRC signaling, the terminal 20 can determine C2 and C3 to determine the CP extension value, and execute UL transmission to which the CP extension is applied.

The control unit may determine the parameter based on the timing advance value, to calculate the CP extension value based on the determined parameter. According to the configuration, even in the case where C2 and C3 are not configured by the RRC signaling, the terminal 20 can determine C2 and C3 to determine the CP extension value, and execute UL transmission to which the CP extension is applied.

The control unit may assume that CP extension value corresponding to the parameter is not indicated by the base station. Even in the case where C2 and C3 are not configured by the RRC signaling, assuming that CP extension value using C2 and C3 is not indicated, the terminal 20 can obtain the CP extension value from a notice by the base station 10 with a small bit length.

Also, according to an embodiment according to the present invention, a communication method executed by a terminal is provided that includes a reception step of receiving information for allocating uplink transmission from a base station; a control step of determining a CP extension value in a case where a parameter for calculating the CP extension value is not configured by the base station upon receiving the information; and a transmission step of executing the uplink transmission by applying the determined CP extension value.

According to the configuration described above, even in the case where C2 and C3 are not configured by the RRC signaling, the terminal 20 can determine C2 and C3 to determine the CP extension value, and execute UL transmission to which the CP extension is applied. Also, even in the case where C2 and C3 are not configured by the RRC signaling, assuming that CP extension value using C2 and C3 is not indicated, the terminal 20 can obtain the CP extension value from a notice by the base station 10 with a small bit length. In other words, in a radio communication system, a value of a CP extension (Cyclic Prefix Extension) can be determined and applied to communication.

Supplement to Embodiments

As above, the embodiment of the present invention has been described; note that the disclosed invention is not limited to the embodiments, and those skilled in the art would understand various modifications, revisions, alternatives, substitutions, and the like. Although the description has been made by using specific numerical examples to facilitate understanding of the invention, unless otherwise stated, these values are merely examples and any suitable values may be used. Partitioning of the items in the above description is not essential to the present invention, and matters described in two or more items may be used in combination as needed, or a matter described in one item may be applied to another matter described in another item (as long as no inconsistency is introduced). The boundaries of functional units or processing units in the functional block diagrams do not necessarily correspond to the physical boundaries of parts. The operations of the multiple functional units may be performed on a single physical part, or the operation of one functional unit may be performed on multiple physical parts. As for the processing steps described in the embodiments, the order of steps may be exchanged as long as no inconsistency is introduced. Although for the sake of convenience of describing processes, the base station 10 and the terminal 20 have been described by using the functional block diagrams, these apparatuses may be implemented by hardware, software, or a combination of these. The software executed by the processor included in the base station 10 according to the embodiment of the present invention and the software executed by the processor included in the terminal according to the embodiment of the present invention, may be stored, respectively, in a random access memory (RAM), a flash memory, a read-only memory (ROM), an EPROM, an EEPROM, a register, a hard disk (HDD), a removable disk, a CD-ROM, a database, a server, or any other suitable recording medium.

Indication of information is not limited to the aspects and the embodiments described in the present disclosure, and may be done by using other methods. For example, indication of information may be performed by physical layer signaling (e.g., DCI (Downlink Control Information), UCI (Uplink Control Information)), upper layer signaling (e.g., RRC (Radio Resource Control) signaling, MAC (Medium Access Control) signaling, broadcast information (MIB (Master Information Block), SIB (System Information Block)), other signals, or a combination of these. Also, RRC signaling may also be referred to as an RRC message, and may also be, for example, an RRC connection setup message, an RRC connection reconfiguration message, or the like.

The aspects and the embodiments described in the present disclosure may be applied to at least one of systems utilizing LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA2000, UMB (Ultra Mobile Broadband), IEEE 802.11 (Wi-Fi) (registered trademark), IEEE 802.16 (WiMAX) (registered trademark), IEEE 802.20, UWB (Ultra-WideBand), Bluetooth (registered trademark), and other suitable systems and next-generation systems extended based on these systems. Also, multiple systems may also be combined (e.g., a combination of at least one of LTE and LTE-A with 5G, etc.) to be applied.

The processing steps, sequences, flowcharts, and the like of the aspects and the embodiments described in the present description may be reordered as long as no inconsistency is introduced. For example, a method described in the present disclosure presents elements of various steps using an exemplary order, and is not limited to the particular order shown.

A specific operation described in the present description to be performed by the base station 10 may be performed by its upper node, depending on circumstances. In a network constituted with one or more network nodes having the base station 10, it is apparent that various operations performed for communication with the terminals 20 may be performed by at least one of the base station 10 and other network nodes (for example, an MME or an S-GW may be considered, but not limited to these) other than the base station 10. In the above description, although a case has been exemplified in which there is a single network node other than the base station 10, the other network nodes may be a combination of multiple other network nodes (e.g., MME and S-GW).

Information, signals, and the like described in the present disclosure may be output from an upper layer (or a lower layer) to a lower layer (or an upper layer). These may be input and output through multiple network nodes.

Information that has been input or output may be stored in a specific location (e.g., memory) or managed by using a management table. Information to be input or output may be overwritten, updated, or added. Information that has been output may be deleted. Information that has been input may be transmitted to other devices.

A determination in the present disclosure may be performed based on a value (0 or 1) represented by one bit; may be performed based on a Boolean value (true or false); or may be performed based on comparison with a numerical value (e.g., comparison with a predetermined value).

Regardless of whether it is referred to as software, firmware, middleware, a microcode, a hardware description language, or any other name, software should be broadly interpreted to mean instructions, an instruction set, a code, a code segment, a program code, a program, a subprogram, a software module, an application, a software application, a software package, a routine, a subroutine, an object, an executable file, a thread, a procedure, a function, and the like.

Also, software, instructions, information, and the like may also be transmitted and received via a transmission medium. For example, if the software is transmitted from a web site, a server, or another remote source by using at least one of a wired technology (coaxial cable, optical fiber cable, twisted pair, digital subscriber line (DSL: Digital Subscriber Line), etc.) and a wireless technology (infrared, microwave, etc.), at least one of these wired technologies and wireless technologies is included in the definition of a transmission medium.

The information, signals, and the like described in the present disclosure may be represented by using any of a variety of different technologies. For example, data, an instruction, a command, information, a signal, a bit, a symbol, a chip, or the like, which may be mentioned throughout the entire description, may be represented by a voltage, a current, an electromagnetic wave, a magnetic field, magnetic particles, an optical field, or photons, or any combination of these.

A term described in the present disclosure and a term necessary for understanding the present disclosure may be replaced by a term having the same or similar meaning. For example, at least one of a channel and a symbol may be a signal (or signaling). Also, a signal may be a message. Also, a component carrier (CC) may also be referred to as a carrier frequency, a cell, a frequency carrier, or the like.

The terms "system" and "network" as used in the present disclosure may be used interchangeably.

Also, information, a parameter, or the like described in the present disclosure may be represented by using an absolute value, may be represented by using a relative value from a predetermined value, or may be represented by using corresponding other information. For example, a radio resource may be one indicated by an index.

A name used for a parameter described above is not a limited name in any respect. Further, a mathematical expression using such a parameter may differ from that explicitly disclosed in the present disclosure. Since various channels (e.g., PUCCH, PDCCH, etc.) and information elements can be identified by all suitable names, the various names assigned to these various channels and information elements are not limited names in any respect.

In the present disclosure, terms such as "base station (BS)", "radio base station", "base station device", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. A base station may be referred to as another term such as a macro cell, a small cell, a femtocell, a pico cell, or the like.

A base station may accommodate one or more (e.g., three) cells. When a base station accommodates multiple cells, the entire coverage area of the base station may be divided into multiple smaller areas, and each of the smaller areas may also provide communication services by a base station subsystem (e.g., an indoor small base station (RHH: Remote Radio Head)). The term "cell" or "sector" indicates a part or the entirety of the coverage area of at least one of the base stations and base station subsystems providing communications services in this coverage.

In the present disclosure, terms such as "mobile station (MS)", "user terminal", "terminal (or UE: User Equipment)", and "terminal" may be used interchangeably.

A mobile station may be referred to by an ordinary skilled person in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or any other suitable term.

At least one of the base station and the mobile station may be referred to as a transmission apparatus, a reception apparatus, a communication apparatus, or the like. Note that at least one of the base station and the mobile station may be a device mounted on a mobile body, the mobile body itself, or the like. The mobile body may be a means of transportation (e.g., an automobile, an airplane, etc.), an unmanned mobile body (e.g., a drone, an autonomous vehicle, etc.), or a robot (a manned or unmanned type). Note that at least one of the base station and the mobile station includes an apparatus that does not necessarily move during a communication operation. For example, at least one of the base station and the mobile station may be an IoT (Internet of Things) device such as a sensor.

In addition, the base station in the present disclosure may be read as a user terminal. For example, the aspects and embodiments of the present disclosure may be applied to a configuration in which communication between a base station and a user terminal is replaced by communication between multiple terminals 20 (may be referred to as, for example, D2D (Device-to-Device), V2X (Vehicle-to-Everything)). In this case, a configuration may be adopted in which the functions included in the above base station 10 are included in the terminal 20. In addition, the words "uplink" and "downlink" may be read as a wording corresponding to communication between terminals (for example, "side"). For example, an uplink channel, a downlink channel, or the like may be read as a side channel.

Similarly, a user terminal in the present disclosure may be read as a base station. In this case, a configuration may be adopted in which the functions included in the user terminal described above are included in the base station.

The terms "determination (or determining)" and "decision (or determining)" used in the present disclosure may encompass a wide variety of operations. For example, "determination" and "decision" may include "determination" and "decision" made with judging, calculating, computing, processing, deriving, investigating, searching (looking up, search, inquiry) (e.g., search in a table, a database, or another data structure), or ascertaining. Also, "determination" and "decision" may include "determination" and "decision" made with, for example, receiving (e.g., receiving information), transmitting (e.g., transmitting information), input, output, or accessing (e.g., accessing data in a memory). Also, "determination" and "decision" may include "determination" and "decision" made with resolving, selecting, choosing, establishing, or comparing. In other words, "determination" and "decision" may include "determination" and "decision" made with a certain action. Also, "determination" and "decision" may be read as "assuming", "expecting", "considering", or the like.

The terms "connected", "coupled", or every variation of these means any direct or indirect connection or coupling between two or more elements, and may encompass a presence of one or more intermediate elements between two elements "connected" or "coupled" to each other. The coupling or connection between elements may be physical, logical, or a combination of these. For example, "connection" may be read as "access". When used in the present disclosure, such two elements may be considered to be "connected" or "coupled" each other by using at least one of one or more wires, cables, and printed electrical connections, or by using, as several non-restrictive and non-comprehensive examples, electromagnetic energy having a wavelength of a radio frequency domain, a microwave domain, light (both visible and invisible), and the like.

A reference signal may be abbreviated as an RS (Reference Signal) and may be referred to as a pilot depending on the standard to be applied.

A description using "based on" in the present disclosure does not mean "based only on" unless otherwise specified. In other words, "based on" means both "based only on" and "based at least on".

Any reference to elements specified with the words "first", "second", and so on used in the present disclosure does not limit the amount or the sequence of these elements in general. These words may be used in the present disclosure as a convenient way for distinguishing two or more elements among each other. Therefore, a reference to first and second elements does not mean that only the two elements are assumed, or that the first element should be considered to precede the second element in some way.

A "means" in the configuration of each of the devices described above may be replaced by "unit", "circuit", "device", and the like.

In the present disclosure, when the terms "include", "including", and variations of these are used, it is intended that these terms are as comprehensive as the term "comprising". Further, it is intended that the term "or" used in the present disclosure is not an exclusive OR.

A radio frame may be constituted with one or more frames in the time domain. In the time domain, each of the one or more frames may be referred to as a subframe. The subframe may be further constituted with one or more slots in the time domain. The subframe may have a fixed time length (e.g., 1 ms) that does not depend on the numerology.

The numerology may include a communication parameter that is applied to at least one of transmission and reception of a signal or a channel. The numerology may present, for example, at least one of subcarrier spacing (SCS), bandwidth, symbol length, cyclic prefix length, transmission time interval (TTI), number of symbols per TTI, radio frame configuration, specific filtering performed by a transceiver in the frequency domain, specific windowing performed by a transceiver in the time domain, and the like.

A slot may be constituted with, in the time domain, one or more symbols (OFDM (Orthogonal Frequency Division Multiplexing) symbols, SC-FDMA (Single Carrier Frequency Division Multiplexing) symbols) symbols, or the like). A slot may be a unit of time based on the numerology.

A slot may include multiple mini slots. Each mini slot may be constituted with one or more symbols in the time domain. A mini slot may also be referred to as a subslot. A mini slot may be constituted with a fewer number of symbols than a slot. PDSCH (or PUSCH) transmitted with a unit of time greater than a mini slot may also be referred to as PDSCH (or PUSCH) mapping type A. PDSCH (or PUSCH) transmitted by using mini slots may also be referred to as PDSCH (or PUSCH) mapping type B.

Any one of a radio frame, a subframe, a slot, a mini slot, and a symbol represents a unit of time when transmitting a signal. Different names may be used for a radio frame, a subframe, a slot, a mini slot, and a symbol, respectively.

For example, one subframe may be referred to as a transmission time interval (TTI); multiple consecutive subframes may be referred to as a TTI; and one slot or one mini slot may be referred to as a TTI. In other words, at least one of the subframe and the TTI may be a subframe (1 ms) in the existing LTE, may be a period shorter than 1 ms (e.g., 1 to 13 symbols), and may be a period longer than 1 ms. Note that the unit representing TTI may also be referred to as slot, mini slot, or the like.

Here, the TTI means, for example, a minimum unit of time of scheduling in radio communication. For example, in an LTE system, a base station performs scheduling by units of TTIs for each terminal 20 to allocate radio resources (such as frequency bandwidth, transmission power, etc., that can be used by each terminal 20). However, the definition of a TTI is not limited as such.

TTI may be a unit of time to transmit channel-coded data packets (transport blocks), code blocks, code words, and the like, or may be a unit of processing such as scheduling, link adaptation, and the like. Note that when a TTI is given, a time interval (e.g., the number of symbols) to which transport blocks, code blocks, code words, or the like are actually mapped may be shorter than the TTI.

In the case where one slot or one mini slot is referred to as a TTI, one or more TTIs (i.e., one or more slots or one or more mini slots) may be a minimum unit of time of scheduling. Also, the number of slots (the number of mini slots) constituting the minimum unit of time of scheduling may be controlled.

A TTI having a time length of 1 ms may be referred to as an ordinary TTI (a TTI in LTE Rel. 8-12), a normal TTI, a long TTI, an ordinary subframe, a normal subframe, a long subframe, a slot, or the like. A TTI shorter than an ordinary TTI may be referred to as a shortened TTI, a short TTI, a partial TTI (or fractional TTI), a shortened subframe, a short subframe, a mini slot, a subslot, a slot, or the like.

Note that a long TTI (e.g., an ordinary TTI, a subframe, etc.) may be read as a TTI having a time length exceeding 1 ms, and a short TTI (e.g., a shortened TTI, etc.) may be read as a TTI having a TTI length shorter than that of a long TTI and longer than or equal to 1 ms.

A resource block (RB) is a unit of resource allocation in the time domain and in the frequency domain, and may include one or more consecutive subcarriers in the frequency domain. The number of subcarriers included in an RB may be the same regardless of the numerology, which may be, for example, 12. The number of subcarriers included in an RB may be determined based on the numerology.

Also, an RB in the time domain may include one or more symbols, and may have a length of one mini slot, one subframe, or one TTI. One TTI, one subframe, and the like may be constituted with one or more resource blocks, respectively.

Note that one or multiple RBs may be referred to as physical resource blocks (PRB), a subcarrier group (SCG), a resource element group (REG), a PRB pair, an RB pair, or the like.

Also, a resource block may be constituted with one or more resource elements (RE). For example, one RE may be a radio resource area of one subcarrier and one symbol.

A bandwidth part (BWP, which may be referred to as a partial bandwidth, etc.) may represent a subset of consecutive common RB (common resource blocks) in terms of certain numerology in a certain carrier. Here, a common RB may be identified by an RB index with reference to a common reference point in the carrier. PRB may be defined in a BWP to be numbered in the BWP.

A BWP may include a BWP for UL (UL BWP) and a BWP for DL (DL BWP). For the UE, one or more BWPs may be configured in one carrier.

At least one of the configured BWPs may be active, and the UE does not need to assume that the UE transmits and receives predetermined signals/channels outside the active BWP. Note that "cell", "carrier", or the like in the present disclosure may be read as "BWP".

The structures of radio frames, subframes, slots, mini slots, symbols, and the like described above are merely examples. For example, configurations of the number of subframes included in a radio frame; the number of slots per subframe or radio frame; the number of mini slots included in a slot; the number of symbols and RBs included in a slot or a mini slot; the number of subcarriers included in an RB; the number of symbols included in a TTI; the symbol length; the length of cyclic prefix (CP); and the like, can be changed in various ways.

In the present disclosure, in the case where an article, for example, "a", "an", or "the" in English, is added by translation, the present disclosure may include a plural form the noun following these articles.

In the present disclosure, the term "A and B are different" may mean "A and B are different from each other". The term may mean "A and B are different from C, respectively". Terms such as "separate" and "coupled" may also be interpreted in the same way as "different."

The aspects and embodiments described in the present disclosure may be used individually, may be combined to be used, or may be switched during execution to be used. Indication of predetermined information (e.g., indication of "being X") is not limited to an explicit indication, and may be done implicitly (e.g., by not indicating the predetermined information).

Note that in the present disclosure, C2 or C3 is an example of a parameter for calculating CP extension value.

As above, the present disclosure has been described in detail; note that it is apparent to those skilled in the art that the disclosure is not limited to the embodiments described in the present disclosure. The present disclosure may be implemented as a modified and changed aspect without deviating from the purpose and scope of the present disclosure defined by the description of the claims. Accordingly, the description of the present disclosure is intended for illustrative purposes and does not have any restrictive meaning with respect to the present disclosure.

DESCRIPTION OF REFERENCE SIGNS 10 base station
110 transmission unit
120 reception unit
130 configuration unit
140 control unit
20 terminal
210 transmission unit
220 reception unit
230 configuration unit
240 control unit
1001 processor
1002 memory device
1003 auxiliary storage device
1004 communication device
1005 input device
1006 output device

The invention claimed is:

1. A terminal comprising:
a reception unit configured to receive a parameter for calculating a cyclic prefix (CP) extension value; and
a control unit configured to determine the parameter for calculating the CP extension value, based on a timing advance value in a case where information of the parameter for calculating the CP extension value is not configured.

2. The terminal as claimed in claim 1, wherein the control unit determines a value of the parameter such that the value is a maximum integer value that satisfies a condition formula including the timing advance value.

3. The terminal as claimed in claim 1, wherein the parameter for calculating the CP extension value is C2 and C3.

4. The terminal as claimed in claim 2, wherein the parameter for calculating the CP extension value is C2 and C3.

5. A system comprising:
a base station that includes
a transmission unit configured to transmit information of a parameter for calculating a cyclic prefix (CP) extension value, to a terminal; and
the terminal that includes:
a reception unit configured to receive the information of the parameter for calculating the CP extension value; and
a control unit configured to determine a value of the parameter for calculating the CP extension value, based on a timing advance value in a case where the information of the parameter for calculating the CP extension value is not configured.

* * * * *